(12) United States Patent
Matsuzawa et al.

(10) Patent No.: US 11,167,675 B2
(45) Date of Patent: Nov. 9, 2021

(54) VEHICLE SEAT

(71) Applicant: NHK Spring Co., Ltd., Yokohama (JP)

(72) Inventors: Tsuyoshi Matsuzawa, Yokohama (JP);
Kenichi Katsube, Yokohama (JP);
Daisuke Tanaka, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 16/845,534

(22) Filed: Apr. 10, 2020

(65) Prior Publication Data
US 2020/0324674 A1    Oct. 15, 2020

(30) Foreign Application Priority Data

Apr. 15, 2019   (JP) .............................. JP2019-077045

(51) Int. Cl.
| | | |
|---|---|---|
| *B60N 2/68* | (2006.01) | |
| *B60N 2/58* | (2006.01) | |
| *B60N 2/80* | (2018.01) | |
| *B60N 2/90* | (2018.01) | |
| *B60N 2/005* | (2006.01) | |

(52) U.S. Cl.
CPC .............. *B60N 2/682* (2013.01); *B60N 2/58* (2013.01); *B60N 2/005* (2013.01); *B60N 2/80* (2018.02); *B60N 2/995* (2018.02)

(58) Field of Classification Search
CPC ........ B60N 2/682; B60N 2/58; B60N 2/5816; B60N 2/995; B60N 2/80; B60N 2/005; B60N 2/01; B60N 2/012

USPC .......................................................... 297/313
See application file for complete search history.

(56) References Cited

U.S. PATENT DOCUMENTS

| | | | | |
|---|---|---|---|---|
| 4,641,884 A * | 2/1987 | Miyashita | ............ | B60N 2/2252 297/284.1 |
| 5,447,356 A * | 9/1995 | Snijders | ................. | A47C 7/405 297/284.3 |
| 8,899,683 B2 * | 12/2014 | Ito | .......................... | B60N 2/688 297/354.11 |
| 2015/0036060 A1* | 2/2015 | Yaghoubi | ............... | H04N 5/655 348/837 |
| 2017/0225751 A1* | 8/2017 | Fuller, IV | .............. | B60N 2/995 |
| 2018/0222350 A1* | 8/2018 | Hirayama | ............ | B60N 2/0244 |
| 2018/0339629 A1* | 11/2018 | Kimura | .................. | B60N 2/686 |

FOREIGN PATENT DOCUMENTS

JP        2017-140987        8/2017

* cited by examiner

*Primary Examiner* — Mark R Wendell
(74) *Attorney, Agent, or Firm* — Dority & Manning, P.A.

(57) ABSTRACT

A vehicle seat includes a seat framework configured including a first frame and a second frame that are capable of supporting an occupant, and a link including a first swing shaft via which the first frame is coupled to one end side of the link and a second swing shaft via which the second frame is coupled to another end side of the link; a first cover that is attached to a back face of the first frame on an opposite side from a front face configured to support the occupant, that covers a back face side of the first frame; and a second cover that is attached to a back face of the second frame on an opposite side from a front face configured to support the occupant, that covers a back face side of the second frame.

7 Claims, 6 Drawing Sheets

VEHICLE SEAT

CROSS-REFERENCE TO RELATED APPLICATION

This application claims priority under 35 USC 119 from Japanese Patent Application No. 2019-077045, filed on Apr. 15, 2019 the disclosure of which is incorporated by reference herein.

BACKGROUND

Technical Field

The present disclosure relates to a vehicle seat.

Related Art

Japanese Patent Application Laid-Open (JP-A) No. 2017-140987 discloses an ottoman device for attachment to a vehicle seat. This ottoman device is provided with a fixed cover, an intermediate cover, and a movable cover that cover a link mechanism from a seat width direction outer side. These covers are disposed so as to be continuous around a circumferential direction of a coupling shaft so as to suppress the fingers of an occupant from becoming trapped.

However, known link mechanisms used in vehicle seats include what are referred to as double hinge mechanisms that include rotation shafts on both sides of a link. The covers disclosed in JP-A No. 2017-140987 cannot be applied to such double hinge mechanisms, and there is therefore room for improvement from the perspective of improving safety.

SUMMARY

In consideration of the above circumstances, the present disclosure provides a Vehicle seat capable of improving safety in a structure including a double hinge.

A vehicle seat according to a first aspect includes a seat framework including a first frame and a second frame that are capable of supporting an occupant, and a link including a first swing shaft via which the first frame is coupled to one end side of the link and a second swing shaft via which the second frame is coupled to another end side of the link; a first cover that is attached to a back face of the first frame on an opposite side from a front face configured to support the occupant, that covers a back face side of the first frame, and that includes a first curved face with a circular arc shaped cross-section profile bulging toward the second frame from a location opposing the second frame; and a second cover that is attached to a back face of the second frame on an opposite side from a front face configured to support the occupant, that covers a back face side of the second frame, and that includes a second curved face with a circular arc shaped cross-section profile bulging toward the first frame from a location opposing the first frame.

In the vehicle seat according to the first aspect the seat framework is configured including the first frame, the second frame, and the link, and the first frame and the second frame are capable of supporting an occupant. The link includes the first swing shaft via which the first frame is coupled to the one end side of the link and the second swing shaft via which the second frame is coupled to the other end side of the link, and configures what is referred to as a double hinge mechanism. Adopting such a double hinge mechanism enables the movement range of the seat framework to be increased and enables the occupant to be stably supported.

The first cover that covers the first frame is attached to the back face of the first frame, and the second cover that covers the second frame is attached to the back face of the second frame. Note that the first curved face with a circular arc shaped cross-section profile bulging toward the second cover is formed at a location of the first cover that opposes the second cover. The second curved face with a circular arc shaped cross-section profile bulging toward the first cover is formed at a location of the second cover that opposes the first cover Thus, even if the hand of the occupant contacts the first curved face and the second curved face in a state in which the first cover and the second cover are being moved or swung in directions approaching each other, force acts in a direction to push the fingers away from the first curved face and the second curved face, thereby enabling trapping of the fingers to be suppressed.

A vehicle seat according to a second aspect is the first aspect, wherein the first curved face runs continuously from one end portion to another end portion of the first cover along a. seat width direction; and the second curved face runs continuously from one end portion to another end portion of the second cover along the seat width direction.

In the vehicle seat according to the second aspect, the first curved face and the second curved face are formed so as run continuously from the one end portions to the other end portions along the seat width direction. This enables the fingers to be more reliably suppressed from becoming trapped than in cases in which the first curved face is only formed at part of the first cover in the seat width direction, and cases in Which the second curved face is only formed at part of the second cover in the seat width direction.

A vehicle seat according to a third aspect is the first or the second aspect, wherein in a state in which the first curved face and the second curved face are at their closest proximity to each other, respective end portions on a front face side of the first curved face and the second curved face abut each other, and respective end portions on a back face side of the first curved face and the second curved face are spaced apart from each other.

In the vehicle seat according to the third aspect, even in the state in which the first curved face and the second curved face at their closest proximity to each other, the back face sides thereof are open. Thus, when force acts in a direction to push the fingers away from the first curved face and the second curved face, the fingers can easily be removed.

A vehicle seat according to a fourth aspect is any one of the first aspect to the third aspect, wherein a pair of seat frameworks are provided opposite to each other in a seat front-rear direction; and each of the seat frameworks is swingably coupled to a base section fixed to a floor section of a vehicle cabin.

In the vehicle seat according to the fourth aspect, for example a seat front side of the vehicle seat can be made to face a vehicle front side by swinging the seat framework at a vehicle front side to an angle capable of supporting the lower body of the occupant from below, and by swinging the seat framework at a vehicle rear side to an angle capable of supporting the upper body of the occupant from behind. Alternatively, the seat front side of the vehicle seat can be made to face the vehicle rear side by swinging the vehicle rear side seat framework to an angle capable of supporting the lower body of the occupant from below, and by swinging the vehicle front side seat framework to an angle capable of supporting the upper body of the occupant from behind.

Namely, the orientation of the vehicle seat can be changed simply by adjusting the angles of the pair of seat frameworks. Furthermore, the fingers (hand) can be suppressed from becoming trapped between the first cover and the second cover when changing the orientation of the vehicle seat.

The vehicle seat of the present disclosure enables safety to be improved in a structure including a double hinge.

BRIEF DESCRIPTION OF THE DRAWINGS

An exemplary embodiment will be described in detail based on the following figures, wherein.

DETAILED DESCRIPTION

Figure 3:
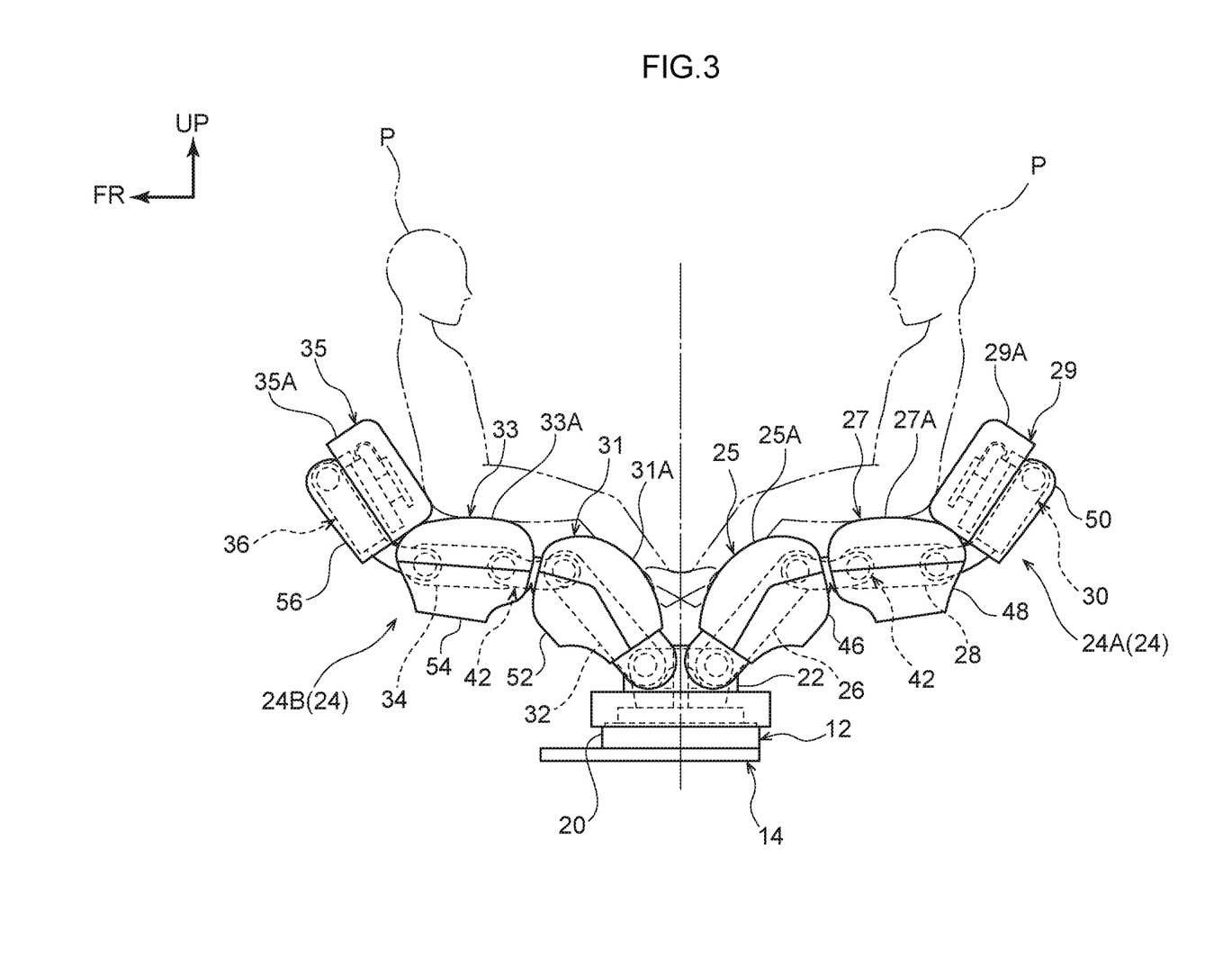
FIG. 3 is a side view illustrating an example of a seating mode of a vehicle seat according to an exemplary embodiment.

Explanation follows regarding a vehicle seat 10 according to an exemplary embodiment of the present disclosure, with reference to the drawings. Note that in the drawings, the arrow FR indicates a seat front, the arrow UP indicates a seat upper side, and the arrow LH indicates a seat left side (namely, one seat width direction side) of the vehicle seat 10, as appropriate. In the present exemplary embodiment, unless specifically stated otherwise, the seat front, seat upper side, and seat left side of the vehicle seat 10 correspond to a vehicle front, a vehicle upper side, and a vehicle left side of a vehicle (namely, an automobile) installed with the vehicle seat 10. The occupants illustrated in FIG. 3 are occupants with a smaller build than an adult occupant with a standard build (for example children).

Overall Configuration

Figure 1:
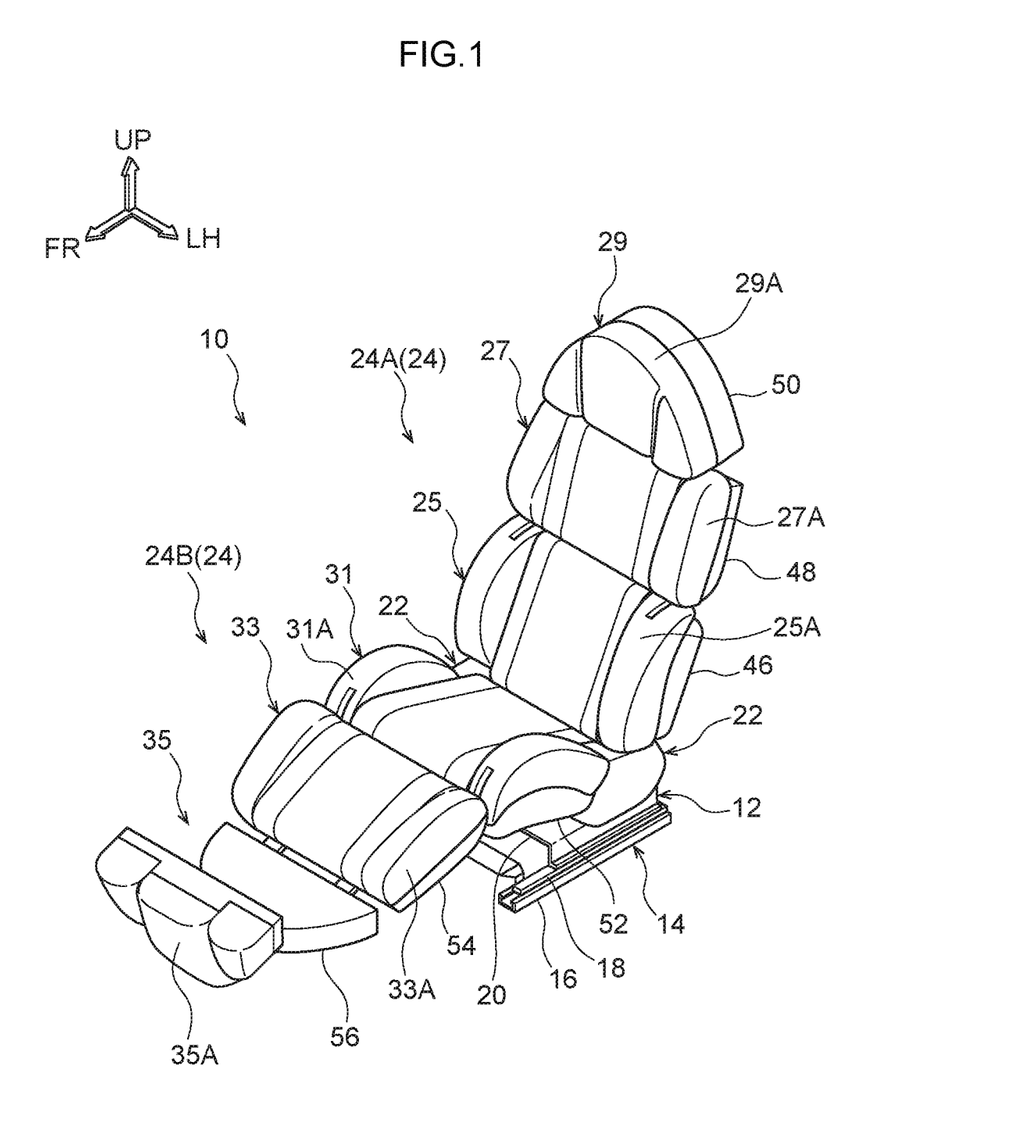
FIG. 1 is a perspective view illustrating an overall configuration of a vehicle seat according to an exemplary embodiment.

As illustrated in FIG. 1, the vehicle seat 10 is configured including a base section 12 configuring a lower section of the vehicle seat 10, and a pair of seat bodies 24 arranged alongside each other in a seat front-rear direction and coupled to the base section 12 so as to be capable of swinging.

The base section 12 is fixed to a non-illustrated floor panel, serving as a floor section of a vehicle cabin, through slide rails 14. Each of the slide rails 14 is configured including a lower rail 16 and an upper rail 18.

The lower rail 16 is formed in an elongated shape with its length direction along the seat front-rear direction, and has a substantially C-shaped cross-section profile open toward the seat upper side as viewed from the seat front. The lower rail 16 is fixed to the floor panel.

The upper rail 18 is provided at the inner side of the corresponding lower rail 16. The upper rail 18 is formed in an elongated shape with its length direction along the seat front-rear direction, and is supported by the lower rail 16 so as to be capable of sliding along the seat front-rear direction. The upper rails 18 slide along the seat front-rear direction with respect to the lower rails 16, thereby enabling the vehicle seat 10 to move along the seat front-rear direction.

A plate 20 configuring the base section 12 is fixed to upper faces of the upper rails 18. The base section 12 is configured including the plate 20 and coupling members 22. The plate 20 is formed in a substantially hat shape as viewed along the seat front-rear direction. Lower end portions of the plate 20 are bent so as to follow the upper faces of the upper rails 18, and these lower end portions of the plate 20 are joined to the upper rails 18.

The coupling members 22 are fixed to an upper face of the plate 20. The respective coupling members 22 are provided at both seat width direction end portions of the plate 20. The seat bodies 24 (a seat body 24A and a seat body 24B) are coupled to the coupling members 22 so as to be capable of swinging.

The seat body 244 is configured including a base end support section 25, an intermediate support section 27, and a leading end support section 29, arranged alongside each other in sequence from the base section 12 side. The seat body 24B is configured including a base end support section 31, an intermediate support section 33, and a leading end support section 35. arranged alongside each other in sequence from the base section 12 side.

The base end support section 25 and the base end support section 31 are formed with substantially the same shape as each other, and one end portion of each is coupled to the coupling members 22 so as to be capable of swinging. The base end support section 25 includes a base end cushion 25A. The base end cushion 25A is capable of supporting the lower back of an occupant.

Similarly, the base end support section 31 includes a base end cushion 31A. The base end cushion 31A is capable of supporting the thighs of the occupant.

The intermediate support section 27 and the intermediate support section 33 are formed with substantially the same shape as each other, and one end portion of each is coupled to the corresponding base end support section 25 or base end support section 31 so as to be capable of swinging, The intermediate support section 27 includes an intermediate cushion 27A. The intermediate cushion 27A is capable of supporting the upper back of the occupant.

Similarly, the intermediate support section 33 includes an intermediate cushion 33A, The intermediate cushion 331A is capable of supporting the calves of the occupant.

The leading end support section 29 and the leading end support section 35 are formed with substantially the same shape as each other, and one end portion of each is coupled to the corresponding intermediate support section 27 or intermediate support section 33 so as to be capable of swinging. The leading end support section 29 includes a leading end cushion 29A. The leading end cushion 294 is capable of supporting the head of the occupant.

Similarly the leading end support section 35 includes a leading end cushion 35A. The leading end cushion 35A is capable of supporting the feet of the occupant. Note that in the present exemplary embodiment, the leading end cushion 35A is configured so as to swing about a leading end portion thereof. This swinging of the leading end cushion 35A opens out the leading end support section 35, When feet are placed on this opened-up section, contact between shoes and the leading end cushion 35A is avoided.

Similarly, the leading end cushion 29A of the leading end support section 29 is also configured so as to swing about its leading end portion, This swinging of the leading end cushion 29A opens out the leading end support section 29.

Note that the base end support section 25, the intermediate support section 27, and the leading end support section 29 are coupled together so as to be capable of swinging with respect to one another, The base end support section 31, the intermediate support section 33, and the leading end support section 35 are also coupled together so as to be capable of swinging with respect to one another. Thus, from the state illustrated in FIG. 1, the base end support section 25, the intermediate support section 27, and the leading end support section 29 are capable of being moved to angles respectively corresponding to those of the base end support section 31, the intermediate support section 33, and the leading end support section 35.

Moreover, the orientation of the vehicle seat 10 can be reversed by then moving the base end support section 31, the intermediate support section 33, and the leading end support section 35 to angles corresponding to those of the base end support section 25, the intermediate support section 27, and the leading end support section 29 in the state illustrated in FIG. 1. Namely, when the occupant sits facing toward the vehicle rear side, the lower back, the upper back, and the head of the occupant are respectively supported by the base end support section 31, the intermediate support section 33, and the leading end support section 35. Moreover, the thighs, the calves, and the feet of the occupant are respectively supported by the base end support section 25, the intermediate support section 27, and the leading end support section 29.

Moreover, as illustrated in FIG. 3, a face-to-face seating mode in which two small-bodied occupants P are able to sit facing each other can be adopted by swinging the respective support sections such that the seat body 24A and the seat body 24B are symmetrical to each other in the seat front-rear direction.

In the face-to-face seating mode, the thighs of the occupants P are respectively supported by the intermediate support section 27 and the intermediate support section 33, and the calves of the occupants P are respectively supported by the base end support section 25 and the base end support section 31. The backs of the occupants P from the lower back to the buttocks are respectively supported by the leading end support section 29 and the leading end support section 35. Note that non-illustrated restraint equipment such as seatbelts may be provided to both the seat body 24A and the seat body 24B in order to restrain the two occupants P to the respective seat bodies 24.

Seat Framework

Figure 2:
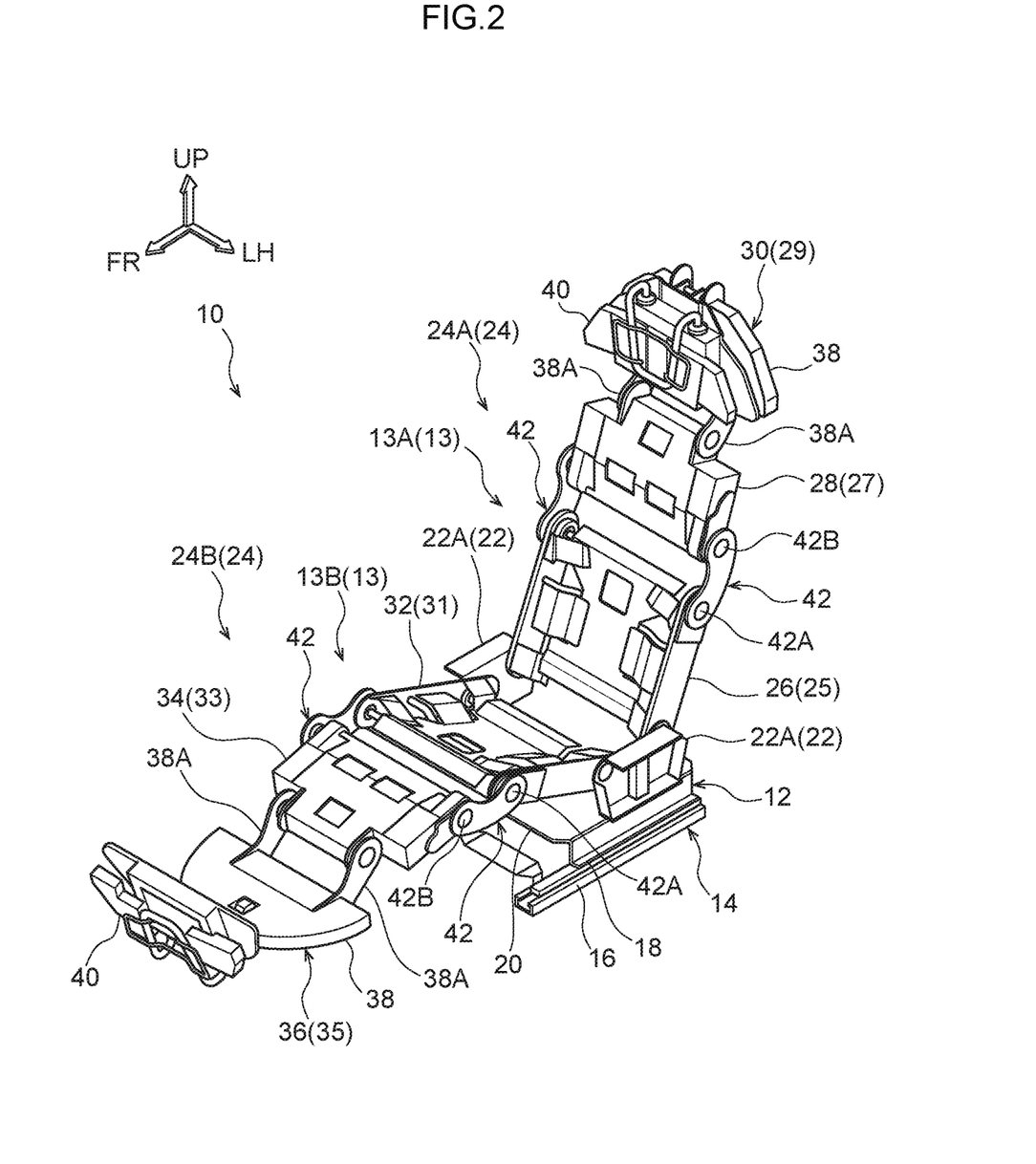
FIG. 2 is a perspective view illustrating a seat framework configuring a vehicle seat according to an exemplary embodiment.

Next, explanation follows regarding a seat framework 13 configuring framework of the vehicle seat 10. As illustrated in FIG. 2, the seat bodies 24 include the seat framework 13. Specifically, the seat body 24A includes a seat framework 13A, and the seat body 24B includes a seat framework 13B.

The seat framework 13A is configured including a base end frame 26 serving as a first frame, an intermediate frame 28 serving as a second frame, and a leading end frame 30, The seat framework 13B is configured including a base end frame 32 serving as a first frame, an intermediate frame 34 serving as a second frame, and a leading end frame 36.

Note that the base end frame 32, the intermediate frame 34, and the leading end frame 36 have substantially the same configuration as the base end frame 26, the intermediate frame 28, and the leading end frame 30 respectively. Thus, the following explanation focuses on the base end frame 26, the intermediate frame 28. and the leading end frame 30, and explanation regarding the base end frame 32, the intermediate frame 34, and the leading end frame 36 is omitted.

The base end frame 26 is for example formed by pressing sheet metal, and has a substantially U-shaped cross-section profile open toward a support face side. An end portion of the base end frame 26 on the base section 12 side is coupled to coupling frames 22A of the coupling members 22 configuring the base section 12 so as to be capable of swinging. An end portion of the base end frame 26 on the opposite side to the base section 12 is coupled to one end portions of links 42 so as to be capable of swinging.

The intermediate frame 28 has a profile in which substantially box shaped members are coupled together in a seat width direction by flat plates. An end portion of the intermediate frame 28 on the base end frame 26 side is coupled to other end portions of the links 42 so as to be capable of swinging. The base end frame 26 and the intermediate frame 28 are thereby coupled together through the links 42.

The leading end frame 30 is configured including a base frame 38 and a sub frame 40. The base frame 38 is formed in a semicircular plate shape, and a left and right pair of coupling tabs 38A extend from the base frame 38 toward the intermediate frame 28. The coupling tabs 38A are coupled to the intermediate frame 28 so as to be capable of swinging.

The sub frame 40 has a shape corresponding to that of the base frame 38, and is illustrated overlaid on the base frame 38 in FIG. 2. In this state, a support face side of the sub frame 40 is capable of supporting the head of the occupant. A leading end side end portion of the sub frame 40 is coupled to the base frame 38 so as to be capable of swinging through a hinge mechanism, such that the leading end frame 30 is opened and closed by swinging the sub frame 40 with respect to the base frame 38. In the leading end frame 36 illustrated in FIG. 2, the sub frame 40 has been swung with respect to the base frame 38 to place the leading end frame 36 in an open state.

The links 42 that couple the base end frame 26 and the intermediate frame 28 together are provided in a left and right pair. Each of the links 42 is formed in an elongated plate shape with its thickness direction along the seat width direction, and includes a first swing shaft 42A at an end portion (the one end portion) on the base end frame 26 side. Each of the links 42 also includes a second swing shaft 42B at an end portion (the other end portion) on the intermediate frame 28 side. Namely, each of the links 42 configures a double hinge mechanism.

Covers

As illustrated in FIG. 1 and FIG. 3, a first cover 46 is attached to a back face of the base end support section 25 on the opposite side to a front face that supports the occupant P. The back face of the base end support section 25 is covered by the first cover 46.

Moreover, a second cover 48 is attached to a back face of the intermediate support section 27 on the opposite side to a front face that supports the occupant P. The back face of the intermediate support section 27 is covered by the second cover 48.

Furthermore, a third cover 50 is attached to a back face of the leading end support section 29 on the opposite side to a front face that supports the occupant P. The back face of the leading end support section 29 is covered by the third cover 50, Similarly, in the seat body 24B, a first cover 52 is attached to a back face of the base end support section 31, and the back face of the base end support section 31 is covered by the first cover 52. A second cover 54 is attached to a back face of the intermediate support section 33, and the back face of the intermediate support section 33 is covered by the second cover 54. A third cover 56 is attached to a back face of the leading end support section 35, and the back face of the leading end support section 35 is covered by the third cover 56.

Figure 4:
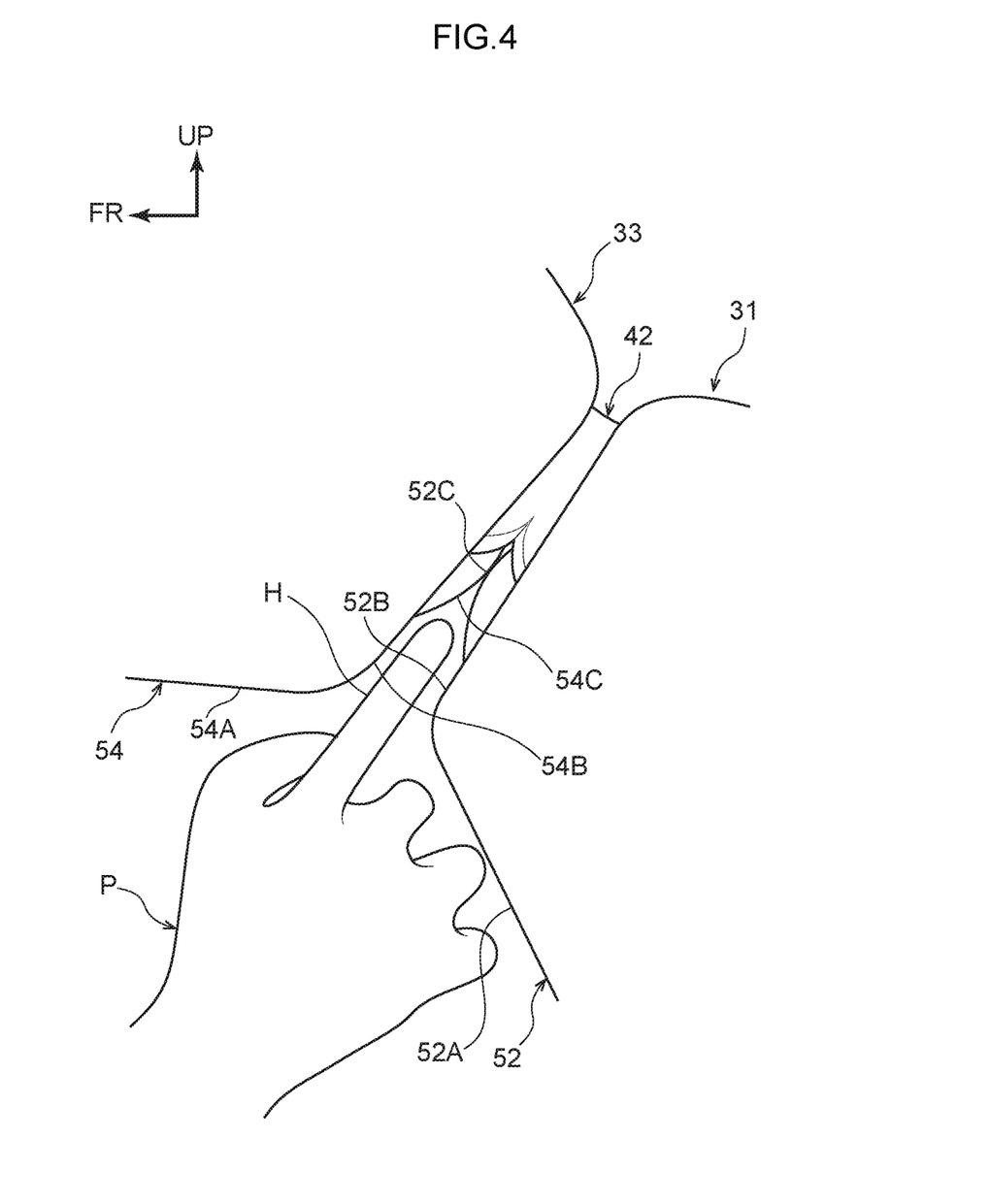
FIG. 4 is an enlarged side view corresponding to FIG. 3.

FIG. 4 is an enlarged side view of a coupling portion between the base end support section 31 and the intermediate support section 33 illustrated in FIG. 3. FIG. 4 illustrates a state in which the first cover 52 and the second cover 54 at their closest proximity to each other.

As illustrated in FIG. 4, the first cover 52 includes a lower wall 52A configuring a lower face of the base end support section 31, and a vertical wall 52B extending from a front end of the lower wall 52A toward the seat upper side. The vertical wall 52B opposes the intermediate support section 33 in the seat front-rear direction.

A first curved face 52C is formed to the vertical wall 52B. The first curved face 52C bulges toward the second cover 54 (intermediate frame 34) from a location of the first cover 52 opposing the second cover 54 (intermediate frame 34).

Specifically, as viewed along the seat width direction, the first curved face 52C is formed slightly further toward the seat upper side than a corner between the lower wall 52A and the vertical wall 52B, and is formed so as to protrude toward the second cover 54. As an example, the first curved face 52C of the present exemplary embodiment is formed so as to run continuously from one end portion to another end portion of the first cover 52 along the seat width direction, and the first curved face 52C is formed with a circular arc shaped external profile with a radius of curvature of 50 mm as viewed along the seat width direction.

The second cover 54 includes a lower wall 54A configuring a lower face of the intermediate frame 34, and a vertical wall 54B extending from a rear end of the lower wall 54A toward the seat upper side. The vertical wall 54B opposes the base end support section 31 in the seat front-rear direction.

A second curved face 54C is formed to the vertical wall 54B. The second curved face 54C bulges toward the first cover 52 (base end frame 32) from a location of the second cover 54 opposing the first cover 52 (base end frame 32).

Specifically, as viewed along the seat width direction, the second curved face 54C is formed slightly further toward the seat upper side than a corner between the lower wall 54A and the vertical wall 54B, and is formed so as to protrude toward the first cover 52. As an example, the second curved face 54C of the present exemplary embodiment is formed so as to run continuously from one end portion to another end portion of the second cover 54 along the seat width direction, and the second curved face 54C is formed with a circular arc shaped external profile with a radius of curvature of 50 mm as viewed along the seat width direction. Thus, the first curved face 52C and the second curved face 54C are symmetrically formed with substantially the same shape as each other, and oppose each other in the seat front-rear direction.

Figure 5:
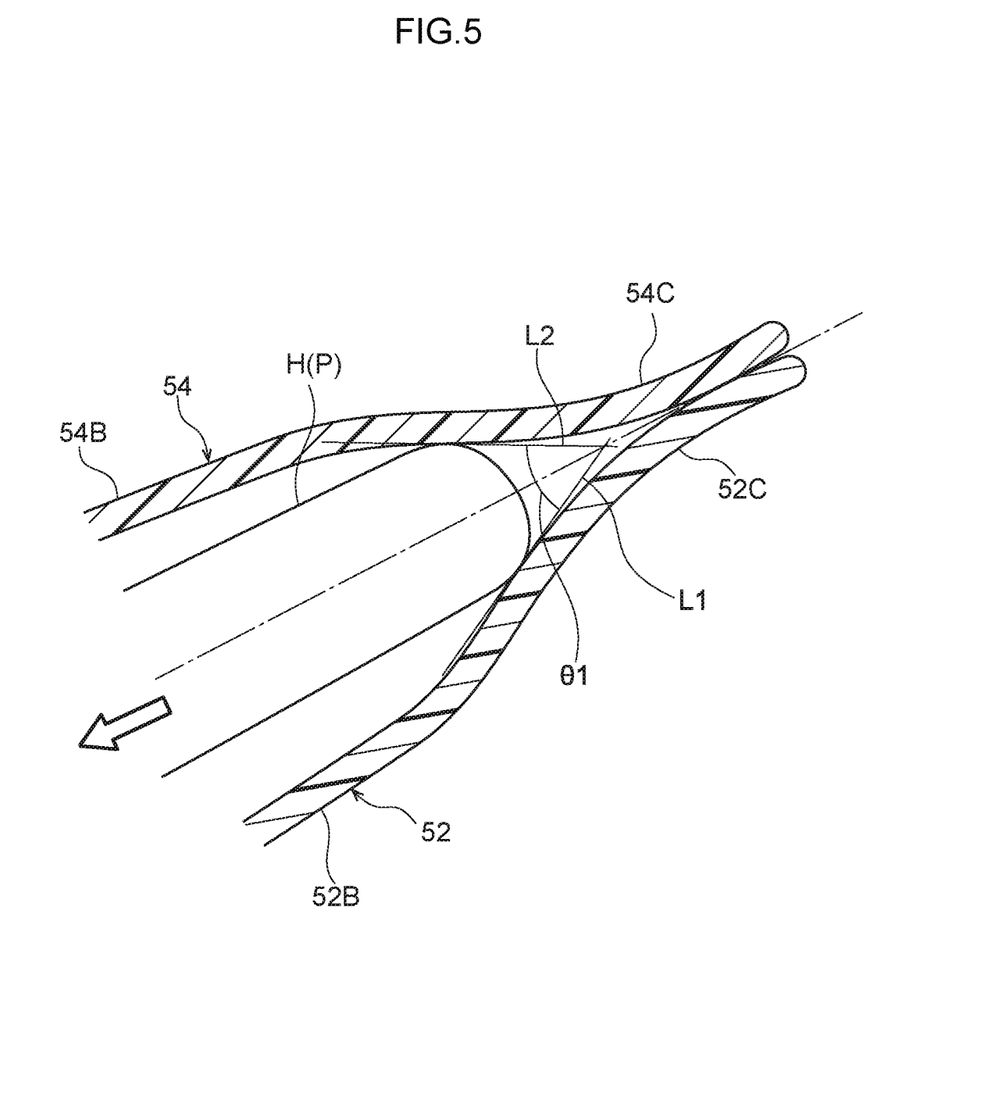
FIG. 5 is an enlarged cross-section of relevant portions of a first cover and a second cover as viewed along a seat width direction, and illustrates one example of a positional relationship between the first cover and the second cover.

As illustrated in Fig. 5, in the state in which the first cover 52 and the second cover 54 are at their closest proximity to each other, end portions on front face sides of the first curved face 52C and the second curved face 54C abut each other. End portions on back face sides of the first curved face 52C and the second curved face 54C are spaced apart from each other.

Note that the first curved face 52C and the second curved face 54C are designed such that in a state in which a finger H (hand) of the occupant P has been inserted between the first cover 52 and the second cover 54, an angle $\theta 1$ where a tangent L1 and a tangent L2 intersect is less than 90°, the tangent L1 being a tangent between the finger H and the first curved face 52C, and the tangent L2 being a tangent between the finger H and the second curved face 54C.

Although not illustrated in the drawings, a first curved face that is similar to that of the first cover 52 is formed to the first cover 46 on the seat body 24A side. Moreover, a second curved face that is similar to that of the second cover 54 is formed to the second cover 48.

Operation

Explanation follows regarding operation of the present exemplary embodiment.

As illustrated in FIG. 2, in the present exemplary embodiment the base end frame 26 and the intermediate frame 28 are coupled together through the links 42, and the base end frame 32 and the intermediate frame 34 are coupled together through the links 42. Each of the links 42 configures a double hinge mechanism including the first swing shaft 42A and the second swing shaft 42B. Adopting such double hinge mechanisms enables the movement range of the seat framework 13 to be increased and enables the occupant to be stably supported.

As illustrated in FIG. 3, the first cover 52 is attached to the back face of the base end frame 32 (base end support section 31), and the second cover 54 is attached to the back face of the intermediate frame 34 (intermediate support section 33). As illustrated in FIG. 4, the first curved face 52C that bulges toward the second cover 54 is formed to the first cover 52 and the second curved face 54C that bulges toward the first cover 52 is formed to the second cover 54. Thus, even if a finger H of the occupant P contacts the first curved face 52C and the second curved face 54C in a state in Which the first cover 52 and the second cover 54 are being moved (swung) in directions approaching each other, force acts in a direction to push the finger H away from the first curved face 52C and the second curved face 54C, thereby enabling trapping of the finger H to be suppressed. Explanation follows regarding this operation, with reference to FIG. 6.

Figure 6:
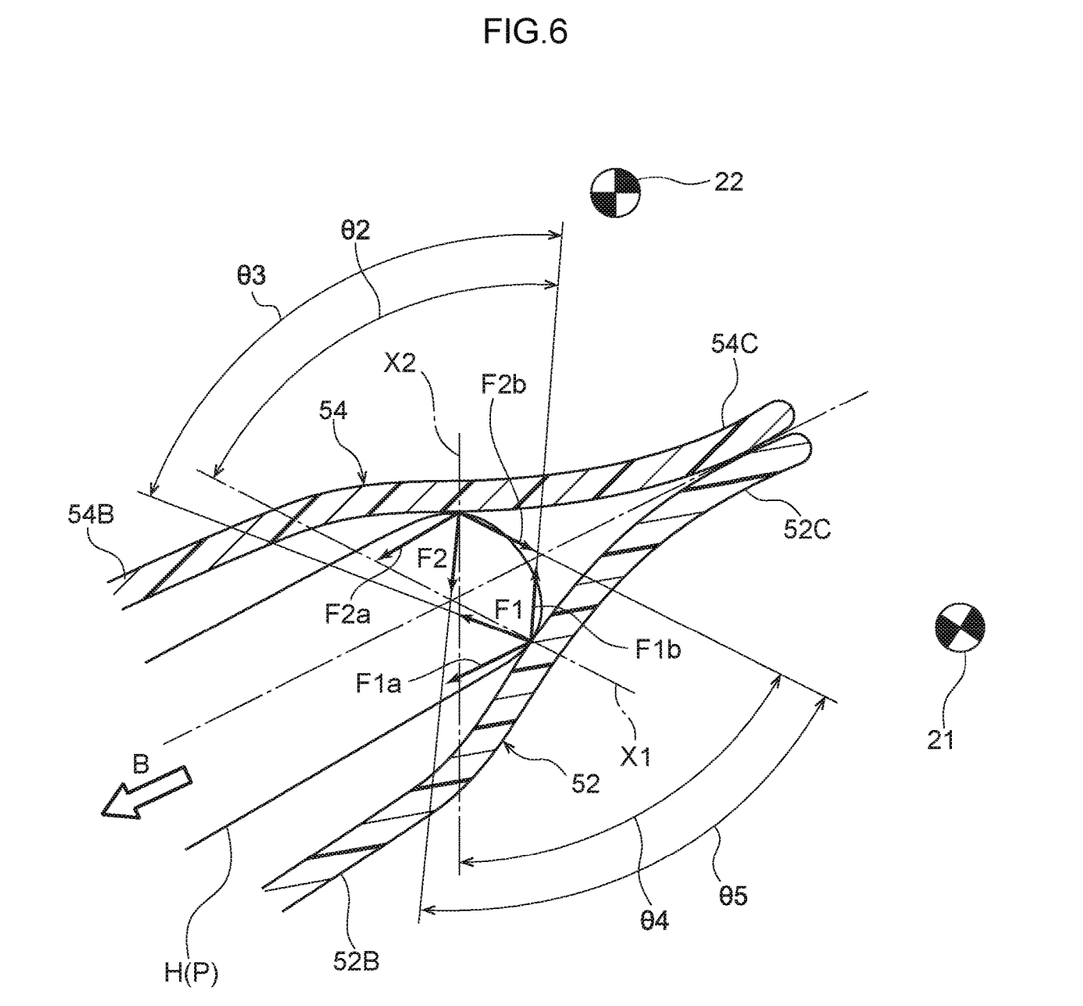
FIG. 6 is an enlarged cross-section of relevant portions of a first cover and a second cover as viewed along a seat width direction, and illustrates another example of a positional relationship between the first cover and the second cover.

As illustrated in FIG. 6, a case is envisaged in which the tip of the finger H of the occupant P contacts the first curved face 52C and the second curved face 54C, When this occurs, out of force acting on the finger H from the first curved face 52C, force in an expelling direction (the arrow B direction in FIG. 6) is represented by a vector F1$a$. Out of force acting on the finger H from the first curved face 52C, force in a direction tangential to a circle of rotation of the first cover 52 (a circle of rotation about a rotation center 21) is represented by a vector F1$b$. The force F1$a$ and the force F1$b$ create a resultant force F1.

Note that when a straight line X1 is drawn so as to pass through a contact point between the finger H and the first curved face 52C in a direction perpendicular to the first curved face 52C, an angle $\theta 2$ is formed between the straight line X1 and the force F1$b$. An angle $\theta 3$ is formed between the resultant force F1 and the force F1$b$. As illustrated in FIG. 6, if the angle $\theta 3$ is larger than the angle $\theta 2$, the force F1$a$ acting to expel the finger H is greater than the force F1$b$ acting to pull the finger H inward, such that force acts in a direction to push (expel) the finger H away from the first curved face 52C.

Similarly, out of force acting on the finger H from the second curved face 54C, force in the expelling direction (the arrow B direction in FIG. 6) is represented by a vector F2$a$. Out of force acting on the finger H from the second curved face 54C, force in a direction tangential to a circle of rotation of the second cover 54 (a circle of rotation about a rotation center 22) is represented by a vector F2b. The force F2a and the force F2b create a resultant force F2.

Note that when a straight line X2 is drawn so as to pass through a contact point between the finger H and the second curved face 54C in a direction perpendicular to the second curved face 54C, an angle θ4 is formed between the straight line X2 and the force F2b. An angle θ5 is formed between the resultant force F2 and the force F2b. As illustrated in FIG. 6, if the angle θ5 is larger than the angle θ4, the force F2a acting to expel the finger H is larger than the force F2b acting to pull the finger H inward, such that force acts in a direction to push (expel) the finger H away from the second curved face 54C.

The forces acting in directions to push the finger H away from the first curved face 52C and the second curved face 54C in this manner enable the finger H (hand) to be suppressed from becoming trapped. Namely, safety can be improved in a structure including a double hinge.

In the present exemplary embodiment, the first curved face 52C and the second curved face 54C are formed so as to run continuously from the one end portions to the other end portions along the seat width direction. This enables the finger H to be more reliably suppressed from becoming trapped than in cases in which the first curved face 52C is only formed at part of the first cover 52 in the seat width direction, and cases in which the second curved face 54C is only formed at part of the second cover 54 in the seat width direction. Namely, the fingers H can be suppressed from becoming trapped regardless of the seat width direction location where the hand is inserted.

Furthermore, in the present exemplary embodiment, even in the state in which the first curved face 52C and the second curved face 54C at their closest proximity to each other, the back face sides thereof, namely the sides in the direction in which the hand is expelled, are open. Thus, when force acts in a direction to push the finger H away from the first curved face 52C and the second curved face 54C, the finger H can easily be removed.

In particular, in structures such as that of the vehicle seat 10 of the present exemplary embodiment, in which the orientation can be changed simply by adjusting the angle of the seat framework 13 (seat bodies 24), the gap between the first cover 52 and the second cover 54 may become narrower when changing the orientation of the vehicle seat 10. Similarly, the gap between the first cover 46 and the second cover 48 may become narrower. Even if a hand is accidentally inserted between the first cover 52 and the second cover 54 in such cases, the fingers H can be suppressed from becoming trapped.

Although the vehicle seat 10 according to an exemplary embodiment has been explained above, obviously various implementations are possible within a range not departing from the spirit of the present disclosure. For example, although the base end frame 26 and the intermediate frame 28 are coupled together by the links 42 with double hinge mechanisms in the above exemplary embodiment as illustrated in FIG. 2, there is no limitation thereto. The intermediate frame 28 and the leading end frame 30 may be coupled together by links 42. In such cases, one out of the intermediate frame 28 or the leading end frame 30 corresponds to a first frame, and the other thereof corresponds to a second frame of the present disclosure.

Moreover, although the pair of seat bodies 24 are provided with seat front-rear direction symmetry in the present exemplary embodiment, there is no limitation thereto. For example, the present structure may be applied to a general vehicle seat configured including a seat cushion, a seatback, and a headrest. In such cases, if a double hinge mechanism is adopted at a coupling portion between the seat cushion and the seatback, slipping of the back when reclining can be suppressed. Alternatively, if the present structure is applied to a cover for the seat cushion and a cover for the seatback, fingers can be suppressed from becoming trapped if a hand is inserted between the covers when transitioning to a reclining state.

Furthermore, although the first curved face 52C and the second curved face 54C are each formed in a circular arc shape with a radius of curvature of 50 mm as viewed along the seat width direction, there is no limitation thereto. Namely, as long as the configuration is such that force acts in a direction to push the finger H away from the first curved face 52C and the second curved face 54C, the radius of curvature of the first curved face 52C and the second curved face 54C may be changed. For example, the first curved face 52C and the second curved face 54C may each be formed in a circular arc shape with a radius of curvature between 40 mm and 60 mm.

What is claimed is:

1. A vehicle seat comprising:
   a seat framework including a first frame and a second frame that are capable of supporting an occupant, and a pair of links spaced apart from each other along a seat width direction, each link including a first swing shaft via which the first frame is rotatably coupled to one end side of the link and a second swing shaft via which the second frame is rotatably coupled to another end side of the link;
   a first cover that is attached to a back face of the first frame on an opposite side from a front face configured to support the occupant, that covers a back face side of the first frame, and that includes a first curved face with a circular arc shaped cross-section profile bulging toward the second frame from a location opposing the second frame; and
   a second cover that is attached to a back face of the second frame on an opposite side from a front face configured to support the occupant, that covers a back face side of the second frame, and that includes a second curved face with a circular arc shaped cross-section profile bulging toward the first frame from a location opposing the first frame.

2. The vehicle seat of claim 1, wherein:
   the first curved face runs continuously from one end portion to another end portion of the first cover along a seat width direction, and
   the second curved face runs continuously from one end portion to another end portion of the second cover along the seat width direction.

3. The vehicle seat of claim 1, wherein:
   in a state in which the first curved face and the second curved face are at their closest proximity to each other, respective end portions on a front face side of the first curved face and the second curved face abut each other, and respective end portions on a back face side of the first curved face and the second curved face are spaced apart from each other.

4. The vehicle seat of claim 1, wherein:
   the seat framework is a first seat framework of a pair of seat frameworks, the first seat framework being provided opposite a second seat framework of the pair of seat frameworks in a seat front-rear direction, and
   each of the pair of seat frameworks is swingably coupled to a base section fixed to a floor section of a vehicle cabin.

5. The vehicle seat of claim 1, further comprising:
a first cushion at the front face of the first frame; and
a second cushion at the front face of the second frame.

6. The vehicle seat of claim 1, wherein:
the first cover comprises a first vertical wall opposing the second frame in a seat front-rear direction, the first curved face bulging from the first vertical wall, and
the second cover comprises a second vertical wall opposing the first frame in the seat front-rear direction, the second curved face bulging from the second vertical wall.

7. The vehicle seat of claim 1, wherein each link has an elongated plate shape with a thickness direction extending along the seat width direction.

* * * * *